(12) United States Patent
Kim et al.

(10) Patent No.: US 11,154,900 B2
(45) Date of Patent: Oct. 26, 2021

(54) DISPLAY APPARATUS AND MANUFACTURING METHOD THEREOF

(71) Applicant: SAMSUNG DISPLAY CO., LTD., Yongin-si (KR)

(72) Inventors: Hoon Sik Kim, Seongnam-si (KR); Young Do Kim, Cheonan-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 35 days.

(21) Appl. No.: 16/677,550

(22) Filed: Nov. 7, 2019

(65) Prior Publication Data

US 2020/0070201 A1 Mar. 5, 2020

Related U.S. Application Data

(62) Division of application No. 15/073,457, filed on Mar. 17, 2016, now Pat. No. 10,500,608.

(30) Foreign Application Priority Data

Apr. 29, 2015 (KR) .................... 10-2015-0060864

(51) Int. Cl.
*B05D 1/32* (2006.01)
*G02F 1/1333* (2006.01)
*B05C 21/00* (2006.01)

(52) U.S. Cl.
CPC ............ *B05D 1/322* (2013.01); *B05C 21/005* (2013.01); *G02F 1/133308* (2013.01); *G02F 1/133331* (2021.01); *G02F 1/133351* (2013.01)

(58) Field of Classification Search
CPC ......... G02F 1/133308; G02F 1/133351; G02F 1/133331; B05D 1/002; B05D 1/32; B05D 1/322; B05D 1/325; B05D 1/327
See application file for complete search history.

(56) References Cited

U.S. PATENT DOCUMENTS

| 8,758,877 B2 | 6/2014 | Hotta et al. |
| 9,552,085 B2 | 1/2017 | Park |
| 2003/0082408 A1 | 5/2003 | Saitoh et al. |
| 2009/0057657 A1 | 3/2009 | Lee et al. |
| 2010/0013786 A1 | 1/2010 | Nishikawa et al. |

(Continued)

FOREIGN PATENT DOCUMENTS

| CN | 102486905 A | 6/2012 |
| CN | 103042803 A | 4/2013 |

(Continued)

OTHER PUBLICATIONS

EPO Extended Search Report dated Jul. 26, 2016, for corresponding European Patent Application No. 16167712.5 (8 pages).

(Continued)

*Primary Examiner* — Michael P Wieczorek
(74) *Attorney, Agent, or Firm* — Lewis Roca Rothgerber Christie LLP

(57) ABSTRACT

A display device according to one or more exemplary embodiments of the present invention includes: a display panel; a window on the display panel; an active surface layer on the window; and a hard coating layer on the active surface layer and having a curved surface.

10 Claims, 9 Drawing Sheets

(56) References Cited

U.S. PATENT DOCUMENTS

| | | | |
|---|---|---|---|
| 2010/0166950 A1* | 7/2010 | Nieminen | G02B 1/11 |
| | | | 427/163.1 |
| 2011/0234529 A1 | 9/2011 | Lee et al. | |
| 2013/0319608 A1 | 12/2013 | Choi et al. | |
| 2014/0132856 A1 | 5/2014 | Hung et al. | |
| 2014/0233194 A1 | 8/2014 | Hongo et al. | |
| 2015/0017393 A1* | 1/2015 | Oh | B32B 15/08 |
| | | | 428/177 |
| 2015/0022979 A1 | 1/2015 | Kang et al. | |

FOREIGN PATENT DOCUMENTS

| | | |
|---|---|---|
| CN | 104299521 A | 1/2015 |
| CN | 104423700 A | 3/2015 |
| JP | 2001-290005 A | 10/2001 |
| JP | 2011-175214 A | 9/2011 |
| KR | 10-2010-0043739 A | 4/2010 |
| KR | 10-2014-0077818 A | 6/2014 |
| KR | 10-2014-0082531 A | 7/2014 |

OTHER PUBLICATIONS

Surface Energy of Plastics, obtained from TriStar website on Feb. 13, 2018.
Chinese Office Action dated May 22, 2020, for corresponding Chinese Patent Application No. 201610279935.7 (6 pages).
Japanese Office Action dated Jun. 9, 2020, for corresponding Japanese Patent Application No. 2016-088057 (5 pages).

* cited by examiner

DISPLAY APPARATUS AND MANUFACTURING METHOD THEREOF

CROSS-REFERENCE TO RELATED APPLICATION

This application is a divisional of U.S. patent application Ser. No. 15/073,457, filed Mar. 17, 2016, which claims priority to and the benefit of Korean Patent Application No. 10-2015-0060864, filed Apr. 29, 2015, the entire content of both of which is incorporated herein by reference.

BACKGROUND

1. Technical Field

The following description relates to a display device and a manufacturing method thereof.

2. Description of the Related Art

Various display devices, such as a liquid crystal display (LCD), a plasma display panel (PDP), an organic light emitting diode (OLED) device, a field effect display (FED), and an electrophoretic display device, may receive touch type input signals (touch input signals) by including a touch panel for application to various informational technological fields.

After a display panel and a touch panel are stacked, a window is disposed on a display panel and a touch panel to protect internal panels from the external environment. A hard coating layer may be additionally formed on a surface of the window that is exposed to the outside to protect the surface of the window.

Typically, a window is formed by cutting a window mother substrate having a large area and on which a hard coating layer has been formed to have desired sizes. As such, a small flaw may be generated at an incision surface of the hard coating layer formed on the window. However, while the flaw at the incision surface of the hard coating layer may be small initially, it may gradually diffuse (increase), thereby deteriorating or reducing visibility of the display device or allowing external contamination materials such as air or moisture to flow into the display device.

The above information disclosed in this Background section is only to enhance the understanding of the background of the invention, and therefore it may contain information that does not form the prior art.

SUMMARY

Aspects of embodiments of the present invention are directed to a display device, and a method of manufacturing the same, which can prevent or reduce the likelihood of the generation of flaws during a cutting process.

According to one or more exemplary embodiments of the present invention, a display device includes: a display panel; a window on the display panel to protect the display panel; an active surface layer on the window; and a hard coating layer on the active surface layer and having a curved surface.

In some embodiments, the active surface layer may be hydrophilic and the hard coating layer may include a material that is higher in surface energy than that of the window.

In some embodiments, the active surface layer may be hydrophobic and the hard coating layer may include a material that is lower in surface energy than that of the window.

A surface of the hard coating layer may have a contact angle that is in a range of greater than 0° to less than 90° at each end portion of the window.

The hard coating layer may have a thickness that is greatest at a center of the display device, and the thickness of the hard coating layer may be reduced toward an end portion of the display device.

The surface of the hard coating layer may have a dome-like shape.

A method of manufacturing a display device according to one or more exemplary embodiments of the present invention includes: preparing a window mother substrate having a window area and a dummy area surrounding the window area; disposing a first mask on the window mother substrate in a first region of the window mother substrate such that the window area is exposed and performing a first surface treatment on a surface of the window mother substrate in a second region corresponding to the window area to form an active surface layer; removing the first mask; coating a hard coating layer forming material on the active surface layer; curing the hard coating layer forming material to form a hard coating layer having a curved surface; and cutting the dummy area and the window area from the window mother substrate to form windows.

The manufacturing method may further include disposing a second mask on the window mother substrate in the second region of the window mother substrate such that the dummy area is exposed, and performing a second surface treatment on the surface of the window mother substrate in the first region corresponding to the dummy area to form a non-active surface layer, and removing the second mask.

One of the surface treatments from among the first surface treatment and the second surface treatment may include a hydrophilic surface treatment and the other one of the surface treatments from among the first surface treatment and the second surface treatment may include a hydrophobic surface treatment.

The hydrophilic surface treatment may include a plasma treatment on the surface of the window mother substrate utilizing at least one selected from a group consisting of air, nitrogen $N_2$, oxygen $O_2$, carbon dioxide $CO_2$, carbon monoxide $CO$, and hydrogen peroxide $H_2O_2$.

The hydrophilic surface treatment may include a plasma treatment on the surface of the window mother substrate utilizing a liquid material having a functional group including a hydrophilic group.

The hydrophobic surface treatment may include a plasma treatment on the surface of the window mother substrate utilizing at least one selected from a group consisting of $CH_4$, $CF_4$, $SF_6$, $NF_3$, $C_3F_6$, and HFC-134a.

The hydrophobic surface treatment may include coating the surface of the window mother substrate utilizing a liquid material having a functional group including a hydrophobic group.

The active surface layer may be hydrophilic and the hard coating layer forming material that is higher in surface energy than that of the window mother substrate.

The active surface layer may be hydrophobic and the hard coating layer forming material that is lower in surface energy than that of the window mother substrate.

The manufacturing method may further include coupling a window from among the windows to the display panel.

A system for manufacturing a display device according to one or more exemplary embodiments of the present invention includes: means for disposing a first mask in a first region of a window mother substrate such that a window area of the window mother substrate is exposed, the window mother substrate having the window area and a dummy area surrounding the window area; means for performing a first surface treatment on a surface of the window mother substrate in a region corresponding to the window area to form an active surface layer; means for removing the first mask; means for coating a hard coating layer forming material on the active surface layer; means for curing the hard coating layer forming material to form a hard coating layer having a curved surface; and means for cutting the dummy area and the window area from the window mother substrate to form windows.

Because a display device and a manufacturing method thereof according to one or more embodiments of the present invention includes a hard coating layer having a curved surface and a window mother substrate that is cut according to boundaries of the hard coating layer and the window, an incision surface may not be formed in the hard coating layer. Therefore, it is possible to prevent or reduce the likelihood of generating flaws or micro flaws that may otherwise be generated on the incision surface of the hard coating layer, and thus the error generation rate of products can be reduced, thereby improving yield.

DETAILED DESCRIPTION

Figure 1:
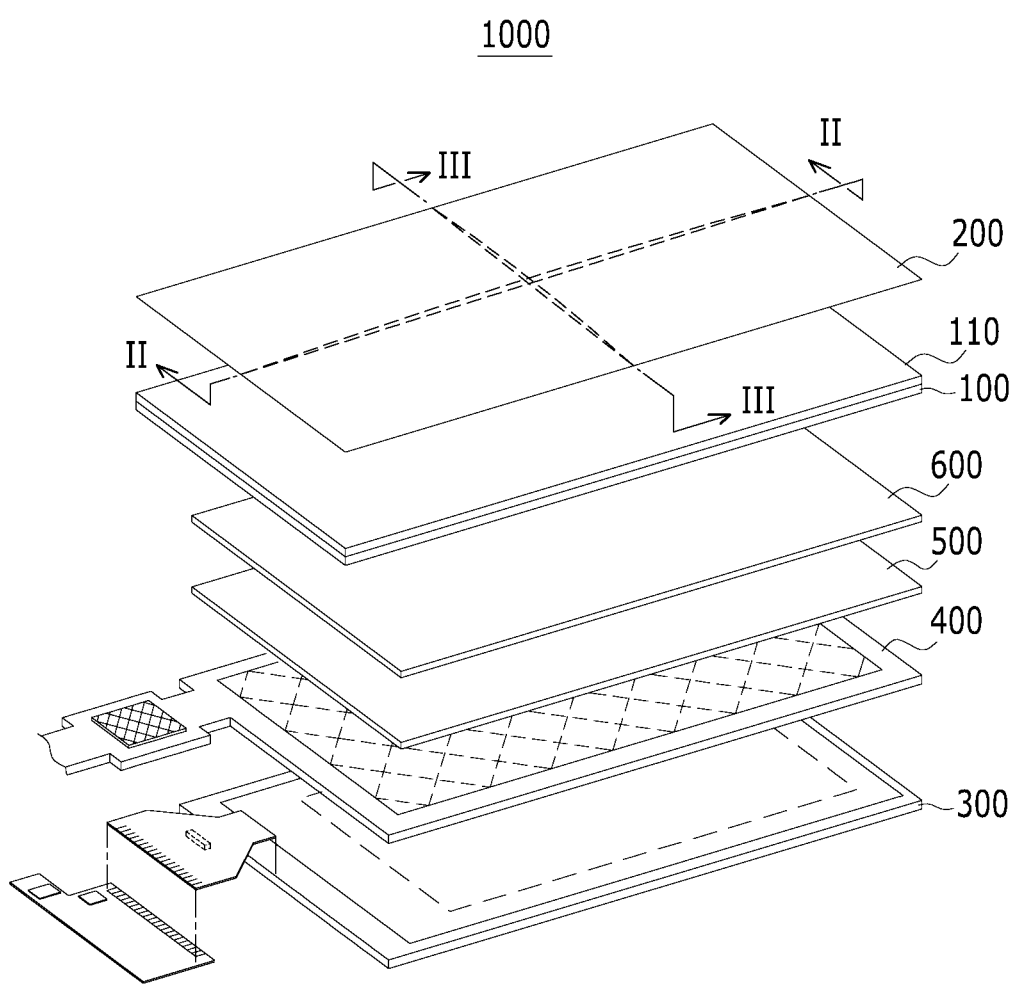
FIG. 1 is an exploded perspective view of a display device according to one or more exemplary embodiments of the present invention.

Hereinafter, exemplary embodiments of the present invention are described in detail with reference to the accompanying drawings. The present invention, however, may be embodied in various different forms, and should not be construed as being limited to only the illustrated embodiments herein. Rather, these embodiments are provided as examples so that this disclosure will be thorough and complete, and will fully convey the aspects and features of the present invention to those skilled in the art. Accordingly, in describing the present invention, a description of known functions or configurations may be omitted so as to make the subject matter of the present invention more clear.

The drawings and description are to be regarded as illustrative in nature and not restrictive. Like reference numerals designate like elements throughout the specification. In addition, the size and thickness of each component shown in the drawings may be arbitrarily shown for better understanding and for ease of description, but the present invention is not limited thereto. In the drawings, the thickness of layers, films, panels, regions, etc., may be exaggerated for clarity.

Figure 2:
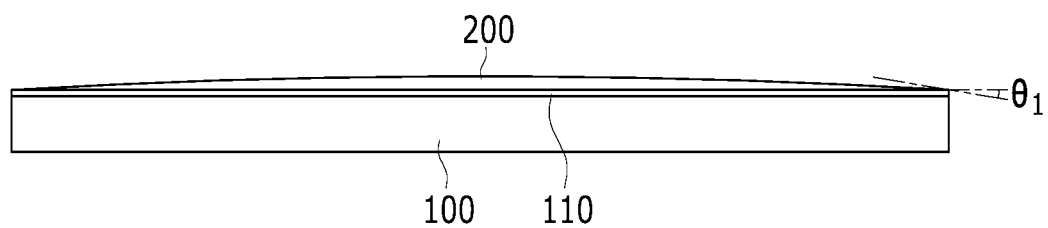
FIG. 2 is a cross-sectional view of a window and a hard coating layer of the display device of FIG. 1 taken along the line II-II of FIG. 1.
Figure 3:
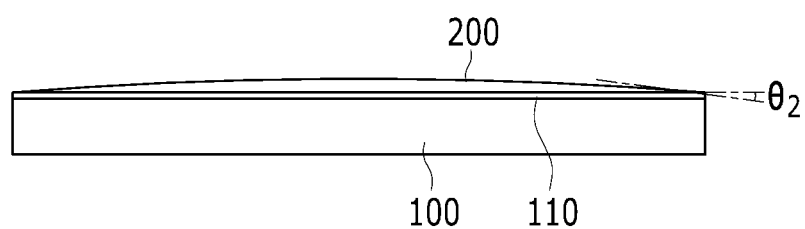
FIG. 3 is a cross-sectional view of a window and a hard coating layer of the display device of FIG. 1 taken along the line III-III of FIG. 1.
Figure 4:
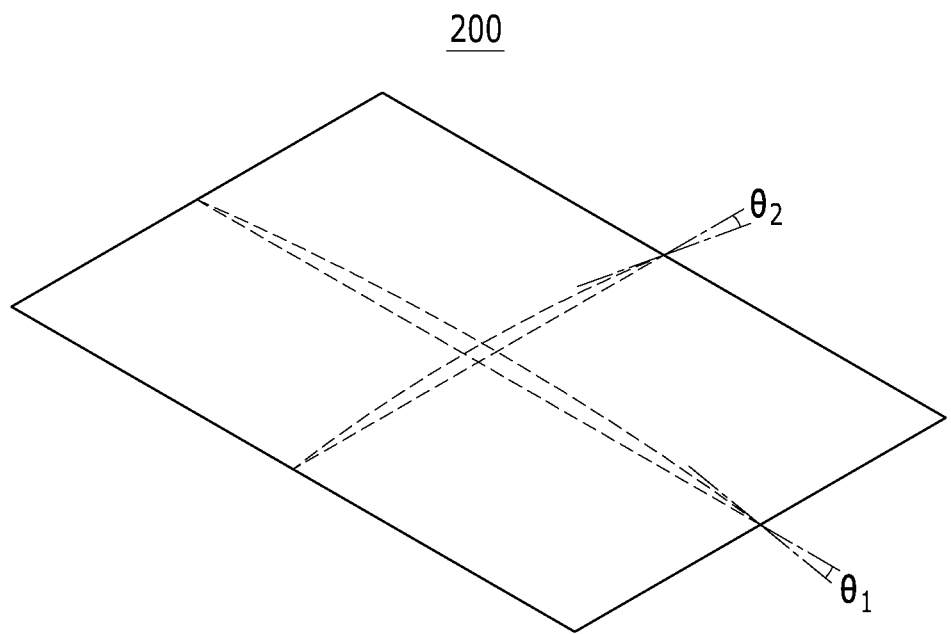
FIG. 4 is an enlarged perspective view illustrating a hard coating layer according to one or more exemplary embodiments of the present invention.

FIG. 1 is an exploded perspective view of a display device according to one or more exemplary embodiments of the present invention, FIG. 2 is a cross-sectional view of a window and a hard coating layer of the display device of FIG. 1 taken along the line II-II of FIG. 1, and FIG. 3 is a cross-sectional view of the window and the hard coating layer of the display device of FIG. 1 taken along the line III-III of FIG. 1. FIG. 4 is an enlarged perspective view illustrating a hard coating layer according to one or more exemplary embodiments of the present invention.

As illustrated in FIG. 1, a display device 1000 according to one or more exemplary embodiments of the present invention includes a display panel 300, a window 100, an active surface layer 110, and a hard coating layer 200.

The display panel 300 according to one or more exemplary embodiments of the present invention is configured to generate an image that is displayed by the display device 1000. The display panel 300 may be any suitable display panel, such as a liquid crystal display panel, a plasma display panel, an organic light emitting display panel, and the like, according to a structure and a principle of generating light, but the present invention is not limited thereto. Further, the display panel 300 may be utilized in a flexible display device and be made of a flexible material.

In one or more embodiments, the display device 1000 may further include a touch panel 400, a phase difference film 500, and a polarizer 600.

The touch panel 400, which includes touch sensors formed on a base substrate and configured to sense an external touch pressure, may function as a signal-input panel for converting a touch-type input signal into an electric signal and transferring the electric signal. That is, the touch panel 400 is an input device for inputting a command by recognizing a user contact position.

The touch panel 400 may be disposed on a front surface of the display device 1000 and is configured to recognize a position at which contact is made by a finger or an object and to determine an input signal. The touch panel 400 may include a resistive touch panel, a capacitive touch panel, an infrared touch panel, an ultrasonic touch panel, and/or the like. In some embodiments, the resistive touch panel or the capacitive touch panel may be used as the touch panel 400.

The phase difference film 500, which performs phase delay on light passing therethrough by λ/4 (quarter wavelength), can convert linearly-polarized light passing through the phase difference film 120 into circularly-polarized light, and vice versa.

The polarizer 600 has a polarization axis and adjusts an optical axis of light emitted to the outside through the display panel 300. Specifically, the light passing through the polarizer 600 can be linearly polarized in a polarization direction.

In some embodiments, the touch panel 400 may be integrated with the polarizer 600 to reduce the thickness thereof, but the present invention is not limited thereto. For example, in some embodiments, the polarizer 600 and the touch panel 400 may be separate.

The window 100 may be disposed on the display panel 300 to protect the display panel 300. For example, the window 100 may protect an inside of the display device 1000 from an external environment by blocking (or substantially blocking) the inside thereof from the outside. The window 100 may be made of a transparent material such as a glass or a synthetic resin such that the window 100 has a transparent optical characteristic for transferring light generated from the display panel 300 to the outside.

The active surface layer 110 may be formed by performing a surface treatment on a surface of the window 100 using a plasma method or a coating method. The active surface layer 110 may improve the adherence of the hard coating layer 200 to the window 100.

The hard coating layer 200 may be formed by coating a forming material of the hard coating layer 200 on the window and then curing it. As illustrated in FIGS. 1-4, the hard coating layer 200 according to one or more exemplary embodiments of the present invention may have a curved surface even when being cured.

The hard coating layer 200 having the curved surface is related to hydrophilicity and hydrophobicity according to a difference between surface energies of the curved surface and the window 100.

As used herein, "hydrophilic" may indicate a characteristic of a material having a surface energy that is higher than that of the window 100, and "hydrophobic" may indicate a characteristic of a material having a surface energy that is lower than that of the window 100.

In some embodiments, when the hard coating layer 200 is hydrophilic, the hydrophilic active surface layer 110 may be formed by performing a hydrophilic surface treatment on the surface of the window 100 on which the hard coating layer 200 is to be formed. In contrast, when the hard coating layer 200 is hydrophobic, the hydrophobic active surface layer 110 may be formed by performing a hydrophobic surface treatment on the surface of the window 100 on which the hard coating layer 200 is to be formed. Such surface treating methods are described further with respect to the descriptions of the manufacturing method of the display device below.

As an example, when the active surface layer 110 is hydrophilic, the hard coating layer 200 may be made of a material that is higher in surface energy than that of the window 100.

When the hard coating layer 200 is made of a material that is higher in surface energy than that of the window 100, the hard coating layer 200 is formed to be hydrophilic. Accordingly, the material (e.g., a forming material) of the hard coating layer 200 is coated on the window 100 by the active surface layer 110 and is formed to be hydrophilic so that the hard coating layer 200 has a curved surface based on a difference between a first attraction generated between the active surface layer 110 and the hard coating layer 200 and a second attraction generated between the hard coating layer 200 and the atmosphere. Accordingly, the forming material of the hard coating layer 200 is cured in the coated shape, thereby forming the hard coating layer 200 having the curved surface.

As another example, when the active surface layer 110 is hydrophobic, the hard coating layer 200 may be made of a material (e.g., a forming material) that is lower in surface energy than that of the window 100.

When the hard coating layer 200 is made of a material that is lower in surface energy than that of the window 100, the hard coating layer 200 is formed to be hydrophobic. Accordingly, the forming material of the hard coating layer 200 is coated on the window 100 by the active surface layer 110 and is formed to be hydrophobic so that the hard coating layer 200 has a curved surface due to surface tension. Accordingly, the forming material of the hard coating layer 200 is cured in the coated shape, thereby forming the hard coating layer 200 having the curved surface.

For example, when the window 100 is made of polyimide, a material that is higher (or greater) than 20 mJ/m$^2$ in surface energy (which is the surface energy of the polyimide) may be utilized to form the hard coating layer 200 that is hydrophilic. In contrast, a material that is lower (smaller) than 20 mJ/m$^2$ in surface energy (which is the surface energy of the polyimide) may be utilized to form the hard coating layer 200 that is hydrophobic.

As another example, when the window 100 is made of polyethylene terephthalate, a material that is higher (greater) than 38 mJ/m2 in surface energy (which is the surface energy of the polyethylene terephthalate) may be utilized to form the hard coating layer 200 that is hydrophilic.

In contrast, a material that is lower (smaller) than 38 mJ/m$^2$ in surface energy (which is the surface energy of the polyethylene terephthalate) may be utilized to form the hard coating layer 200 that is hydrophobic.

The surface energy of a material that is used to form the hard coating layer 200 may be determined depending on a type (kind) and an amount of surfactant that is mixed in the forming material of the hard coating layer 200 and properties such as functional groups of polymers that are added into the forming material of the hard coating layer 200.

FIGS. 2-4 illustrate a cross-section of the window 100 in which the hard coating layer 200 has the curved surface. As illustrated in FIGS. 2-4, the hard coating layer 200 according to the present exemplary embodiment maintains the curved surface even after being cured.

As such, the surface of the hard coating layer 200 according to one or more exemplary embodiments of the present invention may have a contact angle that is in a range of greater than 0° to less than 90° at each end portion of the window 100. FIG. 2 is a cross-sectional view of the window 100 and the hard coating layer 200 taken along the line II-II of FIG. 1, and FIG. 3 is a cross-sectional view of the window 100 and the hard coating layer 200 taken along the line II-III of FIG. 1.

As illustrated in FIG. 2, a first contact angle $\theta_1$ between the surface of the window 100 and the hard coating layer 200 at a longitudinal edge surface of the window 100 may be in a range of greater than 0° to less than 90°. Similarly, as illustrated in FIG. 3, a second contact angle $\theta_2$ between the surface of the window 100 and the hard coating layer 200 at a transverse edge surface of the window 100 may be in a range of greater than 0° to less than 90°.

If the contact angle (e.g., the first contact angle $\theta_1$ and/or the second contact angle $\theta_2$) equals 0°, the surface of the window 100 is completely wetted by a hard coating layer forming material. As such, an incision surface may be formed at the hard coating layer 200 when the window 100 is cut in a direction perpendicular (normal) to the surface of the window 100. Thus, it is difficult to prevent a flaw (e.g., a small flaw or a micro flaw) that may be generated at or on the incision surface of the hard coating layer 200.

Further, if the contact angle equals 90°, the hard coating layer forming material is coated on the surface of the window 100 to have a completely hemispherical shape. As such, wettability of the surface is low, and thus it is difficult to perform the coating smoothly.

Therefore, the hard coating layer 200 according to one or more exemplary embodiments of the present invention may have a contact angle (e.g., the first contact angle $\theta_1$ and/or the second contact angle $\theta_2$) that is in a range of greater than 0° to less than 90° in order to prevent (or reduce the likelihood of) the incision surface being formed while maintaining the wettability of the surface of the window 100.

Although FIGS. 2-3 illustrate the window 100 having a rectangular-shaped cross-section, the present invention is not limited thereto. If the contact angle measured from end portions that are contacted by the window 100 and the hard coating layer 200 (e.g, the contact angle between the surface of the window 100 and the hard coating layer 200 at an edge surface of the window 100) is in a range of greater than 0° to less than 90°, any cross-sectional shape of the window 100 may be included in the scope of the present invention.

Meanwhile, the hard coating layer 200 may have a thickness that is greatest at the center of the display device, and the thickness thereof may be reduced toward an end portion of the display device 1000 (e.g., toward the longitudinal edge surface and the transverse edge surface of the window 100). In other words, a height difference between the surfaces of the window 100 and the hard coating layer 200 is greatest at the center of the display device 1000 and is reduced toward an end portion thereof (e.g., the longitudinal edge surface and the transverse edge surface). The height difference may approach zero at the end portion. Accordingly, the hard coating layer 200 may be formed to have a dome-like shape regardless of a cross-sectional shape thereof.

When the hard coating layer 200 having a curved surface is formed on the window 100, it is possible to prevent or reduce the likelihood of creating a flaw (e.g., a small flaw or a micro flaw) on an incision surface of the window 100 or the hard coating layer 200 when an end portion (e.g., the longitudinal edge surface and/or the transverse edge surface) of the window 100 is cut. Thus, the generation of product defects can be reduced, thereby improving yield.

According to one or more exemplary embodiments of the present invention, a method of manufacturing a display device includes preparing a window mother substrate M, forming an active surface layer 110, removing a first mask 10, coating a forming material of a hard coating layer 200, forming the hard coating layer 200, and forming the window 100.

Figure 5:
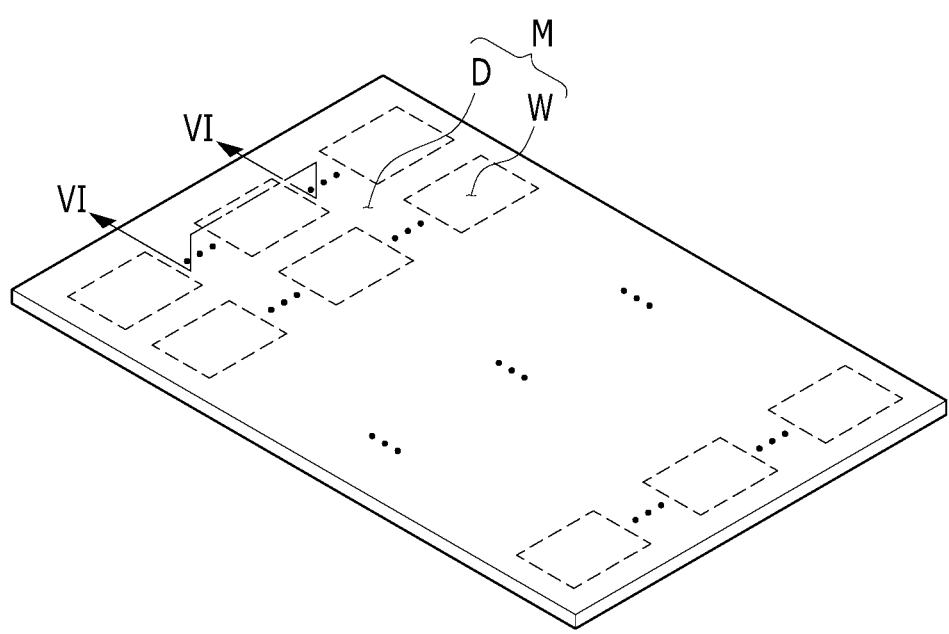
FIG. 5 illustrates a perspective view of a window mother substrate including a window area and a dummy area that are defined according to one or more exemplary embodiments of the present invention.

FIG. 5 illustrates a perspective view of the window mother substrate M including a window area W and a dummy area D that are defined (e.g., virtually defined) thereon according to one or more exemplary embodiments of the present invention. As illustrated in FIG. 5, the operation of preparing the window mother substrate M includes preparing the window area W and the dummy area D formed around (or to surround) the window area W.

In the following cutting process, the dummy area D is removed from the window mother substrate M, thereby forming each window 100. As such, a flaw (e.g., a small flaw or a micro flaw) may be generated on a window 100 or an incision surface of a hard coating layer 200 of the window 100.

To prevent or reduce the likelihood of generating a flaw by (or during) cutting, the method of manufacturing the display device 1000 according to one or more exemplary embodiments of the present invention includes the operation of forming the active surface layer 110.

Figure 6:
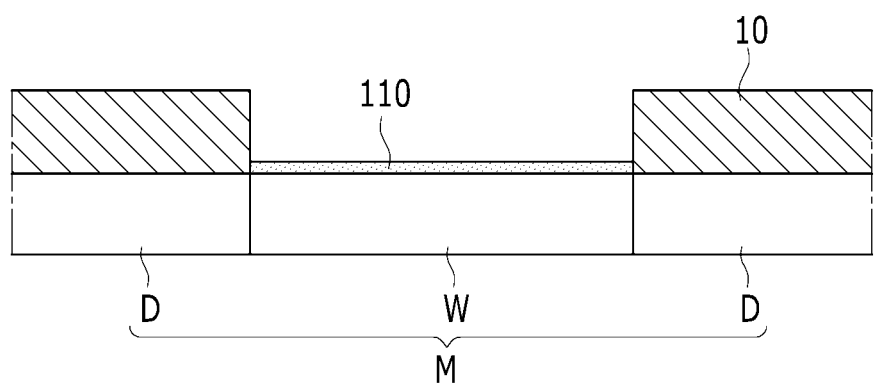
FIG. 6 illustrates a side elevational view of a first mask disposed on the window mother substrate of FIG. 5 taken along the line VI-VI of FIG. 5 to form an active surface layer.

FIG. 6 illustrates a side elevational view of a first mask disposed on the window mother substrate M taken along the line VI-VI of FIG. 5, to form an active surface layer thereon. As illustrated in FIG. 6, the active surface layer 110 is formed on a surface of the window mother substrate M such that the hard coating layer 200 is formed only at a region corresponding to the window area W.

According to one or more exemplary embodiments of the present invention, to form the active surface layer 110, the first mask 10 is disposed on the window mother substrate M in a first region of the window mother substrate M such that the window area W is exposed (or open), and a first surface treatment is performed on a surface of the window mother substrate M in a region corresponding to the window area (e.g., a region that is exposed by the first mask 10) to form the active surface layer 110.

After the active surface layer 110 is formed, the first mask 10 is removed.

Figure 7:
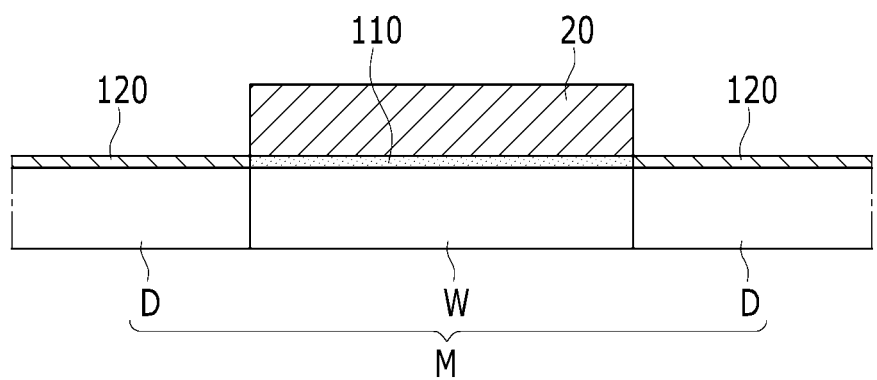
FIG. 7 illustrates a side elevational view of a second mask disposed on the window mother substrate of FIGS. 5-6 to form a non-active surface layer.

FIG. 7 illustrates a side elevational view of a second mask disposed on the window mother substrate M that is used to form a non-active surface layer. In one or more exemplary embodiments of the present invention, the manufacturing method may further include an operation of forming the non-active surface layer 120 by using a second mask 20 and removing the second mask 20.

By forming the non-active surface layer 120, a property difference between the window area W and the dummy area D (which are virtually defined on the window mother substrate M) may increase to facilitate formation of the hard coating layer 200.

As illustrated in FIG. 7, the non-active surface layer 120 can be formed by disposing the second mask 20 on the window mother substrate M in a second region of the window mother substrate M such that the dummy area D is exposed (or open) and performing a second surface treatment on the surface of the window mother substrate M in a region corresponding to the dummy area D (e.g., a region that is exposed by the second mask 20).

As illustrated in FIG. 7, in some embodiments, the active surface layer 110 may be formed first and then the second mask 20 may be used to form the non-active surface layer 120, but the present invention is not limited thereto. For example, in some embodiments the non-active surface layer 120 may be formed first and then the active surface layer 110 may be formed.

After the non-active surface layer 120 is formed, the second mask 20 is removed.

According to one or more exemplary embodiments of the present invention, a surface treatment method, which may be performed on the window mother substrate M to form the active surface layer 110 and the non-active surface layer 120, may be hydrophilic or may be hydrophobic depending on the surface energies of the window 100 and hard coating layer 200.

According to one or more exemplary embodiments of the present invention, the active surface layer 110 may be subjected to the first surface treatment in order to be either hydrophilic or hydrophobic, and the non-active surface layer 120 may be subjected to the second surface treatment to be the other of hydrophilic and hydrophobic. In other words, one of the first or second surface treatments may be a hydrophilic surface treatment and the other of the first or second surface treatments may be a hydrophobic surface treatment.

As one example, when the first surface treatment on the active surface layer 110 is a hydrophilic surface treatment, the second surface treatment on the non-active surface layer 120 is a hydrophobic surface treatment. As another example, when the first surface treatment on the active surface layer 110 is a hydrophobic surface treatment, the second surface treatment on the non-active surface layer 120 is a hydrophilic surface treatment.

In some embodiments, a plasma process and/or a coating method may be used to perform a surface treatment on the surface of the window mother substrate M to be hydrophilic or hydrophobic. However, the present invention is not limited thereto. As such, any surface treatment method for providing hydrophilicity or hydrophobicity is within the scope of the present invention.

As an example, the hydrophilic surface treatment may include a plasma treatment on the surface of the window mother substrate M by utilizing air, nitrogen ($N_2$), oxygen ($O_2$), carbon dioxide ($CO_2$), carbon monoxide (CO), and/or hydrogen peroxide ($H_2O_2$) to make the active surface layer 110 and/or the non-active surface layer 120 hydrophilic.

As another example, the hydrophilic surface treatment may include coating the surface of the window mother substrate M by utilizing a liquid material having a functional group including a hydrophilic group to make the active surface layer 110 and/or the non-active surface layer 120 hydrophilic.

As another example, the hydrophobic surface treatment may include a plasma treatment on the surface of the window mother substrate M by utilizing $CH_4$, $CF_4$, $SF_6$, $NF_3$, $C_3F_6$, and/or HFC-134a to make the active surface layer 110 and/or the non-active surface layer 120 hydrophobic.

As yet another example, the hydrophobic surface treatment may include coating the surface of the window mother substrate M by utilizing a liquid material having a functional group including a hydrophobic group to make the active surface layer 110 and/or the non-active surface layer 120 hydrophobic.

Figure 8:
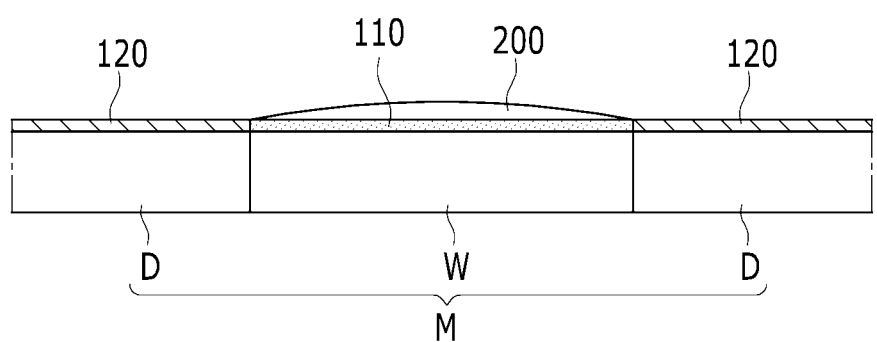
FIG. 8 illustrates a side elevational view of a hard coating layer on the active surface layer on the window mother substrate of FIGS. 5-7.

FIG. 8 illustrates a side elevational view of the hard coating layer 200 on the active surface layer on the window mother substrate M. As illustrated in FIG. 8, after the active surface layer 110 or the non-active surface layer 120 is formed on the window mother substrate M, a forming material for the hard coating layer 200 may be coated on the active surface layer 110.

As described above, the forming material for the hard coating layer 200 may be determined according to a surface energy difference between the window mother substrate M and the hard coating layer 200.

When the surface of the active surface layer 110 is hydrophilic, the forming material for the hard coating layer 200 may have a surface energy that is higher than that of the window mother substrate M. In contrast, when the non-active surface layer 120 is hydrophobic, the forming material for the hard coating layer 200 may have a surface energy that is lower than that of the window mother substrate M.

After the forming material of the hard coating layer 200 is coated on the active surface layer 110, the coated forming material may be cured to form the hard coating layer 200 having a curved surface. The forming material for the hard coating layer 200 is cured while maintaining the curved surface, thereby forming the hard coating layer 200 having the curved surface.

As described above, the hard coating layer 200 having the curved surface may have a contact angle (e.g., the first contact angle $\theta_1$ and/or the second contact angle $\theta_2$) that is in a range of greater than 0° to less than 90° at each end portion of the window 100, may have a thickness that is greatest at the center of the display device, and the thickness thereof may be reduced toward an end portion of the display device. As such, the hard coating layer 200 may be formed to have a dome-like shape.

Figure 9:
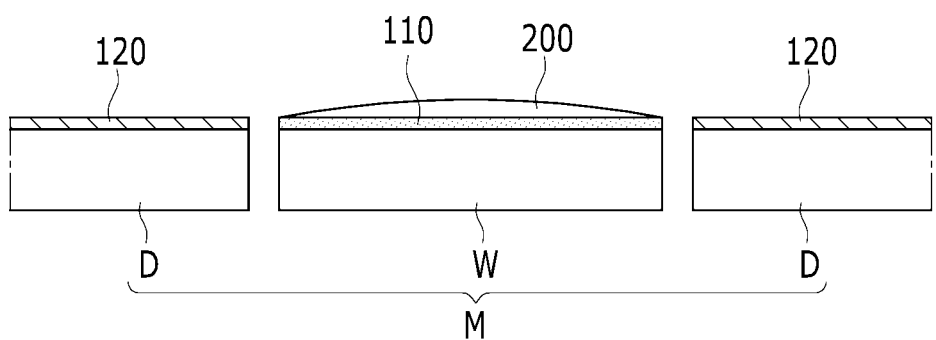
FIG. 9 illustrates a side elevational view of a window formed by cutting the window mother substrate of FIGS. 5-8.

After the hard coating layer 200 is cured, the window 100 may be formed by cutting the window mother substrate M. FIG. 9 illustrates a side elevational view of the window 100 that is formed by cutting the window mother substrate M. As illustrated in FIG. 9, the window 100 may be formed by cutting the window mother substrate M according to boundaries of the dummy area D and the window area W.

According to one or more exemplary embodiments of the present invention, the hard coating layer 200 is formed to have a curved surface. Particularly, as described above, because the hard coating layer 200 has a contact angle that is in a range of greater than 0° to less than 90° at each end portion (e.g., the longitudinal edge surface and the transverse edge surface) of the window 100 or is formed to have a dome-like shape, an incision surface may be formed only at the surface of the window 100, and no incision surface may be formed in the hard coating layer 200. Accordingly, it is possible to prevent or reduce the likelihood of generating a flaw (e.g., a micro flaw) that may otherwise be generated on an incision surface of the hard coating layer 200 formed by cutting of the window mother substrate M.

Meanwhile, the manufacturing method of the display device 1000 according to one or more exemplary embodiments of the present invention may further include coupling the window 100 to the display panel 300. The manufacturing method may be included in the scope of the present invention regardless of the sequence between attachment of the display panel and cutting of the window mother substrate M, such as completing the display device by performing a surface treatment on the surface of the window mother substrate M to which the display panel 300 is attached and cutting it, or by performing a surface treatment on the surface of the window mother substrate M after attaching the display panel 300 to the window mother substrate M and cutting it. However, the present invention is not limited thereto, and various other exemplary embodiments are possible. Any manufacturing method of the display device 1000 including an attaching process of the display device and a cutting process of the window mother substrate M may be included in the scope of the present invention.

A display device and a manufacturing method thereof according to one or more exemplary embodiments of the present invention are described above. According to one or more exemplary embodiments of the present invention, because the hard coating layer 200 is formed to have a curved surface and the window mother substrate M is cut according to the boundaries of the hard coating layer 200 and the window 100, an incision surface may not be formed in the hard coating layer 200. Therefore, it is possible to prevent or reduce the likelihood of generating flaws or micro flaws that may otherwise be generated on an incision surface of the hard coating layer 200, and thus a product error generation rate can be reduced, thereby improving yield.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims and their equivalents.

It will be understood that, although the terms "first," "second," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present invention.

It will be understood that when an element such as a layer, film, region, or substrate is referred to as being "on" another element, it can be directly on the other element or intervening elements may also be present.

The terminology used herein is for the purpose of describing particular embodiments and is not intended to be limiting of the present invention. As used herein, the singular forms "a" and "an" are intended to include the plural forms as well, unless the context clearly indicates otherwise. It will be further understood that the terms "comprises," "comprising," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present invention refers to "one or more embodiments of the present invention." As used herein, the terms "use," "using," and "used" may be considered synonymous with the terms "utilize," "utilizing," and "utilized," respectively. Also, the term "exemplary" is intended to refer to an example or illustration.

The electronic or electric devices and/or any other relevant devices or components according to embodiments of the present invention described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the exemplary embodiments of the present invention.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

| Description of Some of the Symbols | |
|---|---|
| 10: first mask | 20: second mask |
| 100: window | 110: active surface layer |
| 120: non-active surface layer | 200: hard coating layer |
| 300: display panel | 400: touch panel |
| 500: phase difference film | 600: polarizer |
| 1000: display device | M: window mother substrate |
| W: window area | D: dummy area |
| $\theta_1$: first contact angle | $\theta_2$: second contact angle |

What is claimed is:

1. A method of manufacturing a display device comprising a display panel, the method comprising:
preparing a window mother substrate having a window area and a dummy area surrounding the window area;
disposing a first mask on the window mother substrate in a first region of the window mother substrate such that the window area is exposed, and performing a first surface treatment on a surface of the window mother substrate in a region corresponding to the window area to form an active surface layer;
removing the first mask;
coating a hard coating layer forming material on the active surface layer;
curing the hard coating layer forming material to form a hard coating layer having a curved surface; and
cutting the dummy area and the window area from the window mother substrate to form windows.

2. The method of claim 1, further comprising:
disposing a second mask on the window mother substrate in a second region of the window mother substrate such that the dummy area is exposed and performing a second surface treatment on the surface of the window mother substrate in a region corresponding to the dummy area to form an non-active surface layer; and
removing the second mask.

3. The method of claim 2, wherein one of the surface treatments from among the first surface treatment and the second surface treatment is a hydrophilic surface treatment and the other one of the surface treatments from among the first surface treatment and the second surface treatment is a hydrophobic surface treatment.

4. The method of claim 3, wherein the hydrophilic surface treatment comprises a plasma treatment on the surface of the window mother substrate utilizing at least one selected from a group consisting of air, nitrogen $N_2$, oxygen $O_2$, carbon dioxide $CO_2$, carbon monoxide CO, and hydrogen peroxide $H_2O_2$.

5. The method of claim 3, wherein the hydrophilic surface treatment comprises a plasma treatment on the surface of the window mother substrate utilizing a liquid material having a functional group comprising a hydrophilic group.

6. The method of claim 3, wherein the hydrophobic surface treatment comprises a plasma treatment on the surface of the window mother substrate utilizing at least one selected from a group consisting of $CH_4$, $CF_4$, $SF_6$, $NF_3$, $C_3F_6$, and HFC-134a.

7. The method of claim 3, wherein the hydrophobic surface treatment comprises coating the surface of the window mother substrate utilizing a liquid material having a functional group comprising a hydrophobic group.

8. The method of claim 3, wherein the active surface layer is hydrophilic and the hard coating layer forming material is higher in surface energy than that of the window mother substrate.

9. The method of claim 3, wherein the active surface layer is hydrophobic and the hard coating layer forming material is lower in surface energy than that of the window mother substrate.

10. The method of claim 1, further comprising coupling a window from among the windows to the display panel.

* * * * *